Patented Apr. 27, 1954

2,676,935

UNITED STATES PATENT OFFICE 2,676,935

NONDISCOLORING THERMOCOUPLING COMPOUND

Morris Braunstein, Cleveland, Ohio, assignor to The Sheffield Bronze Paint Corporation, Cleveland, Ohio No Drawing. Application December 6, 1951, Serial No. 260,306

2 Claims. (Cl. 260—28.5)

This invention relates to paint film forming compounds and particularly to a compound that provides a film that will not discolor or separate from the protected surface when subjected to high temperatures.

Conducive to a better understanding of this invention it may be well to point out that industrially speaking there are broadly two classes of metals, namely: those that corrode readily, such as iron or common steel and those that resist corrosion, such as nickel, copper, chromium, silver, lead, zinc, gold and aluminum. While these corrosion resistant metals have a long life, their high cost prohibits their use in most cases. Therefore, iron and steel have become the common metals of industry. However, the life expectancy of iron and steel structures can be lengthened materially by the application of a protective coating of one of the corrosion resistant metals, or their compounds, to all exposed surfaces. These metals may be deposited directly upon the iron or steel surface by electroplating, which is a relatively expensive operation unless the object so plated is comparatively small. Furthermore, the cost of re-coating such a protected surface after the original plating has worn away is prohibitive due to the fact that the structure must usually be dismantled to accomplish this.

The other and more common method is to suspend the protective metal in a carrier film that is spread over the base metal by brushing, dipping or spraying. This carrier or vehicle is usually made up of resins or drying oils, a drier and a thinner. The protective metal is reduced to a powder and mixed with the vehicle. Aluminum in flake form has been an effective protective medium for covering iron and steel surfaces since the flakes have a tendency to overlap one another to form a continuous protective coat. In a polished flake form aluminum has high hiding properties, good reflective action toward both light and heat and is decorative in appearance. However, when applied to surfaces that are subjected to heat such as furnace shells, hot water heaters, ovens, etc., the prior art paints, including those of aluminum, normally turn brown at a temperature above 400° Fahrenheit.

The resulting discoloration is permanent and does not disappear upon cooling of the paint film, whose reflecting and decorative properties are radically depreciated thereby.

Heating of the paint film not only mars the film's appearance but also causes the adhesive properties of the film to be destroyed, there being a marked tendency for the film to separate from the base metal and form blisters, which eventually flake off, leaving unsightly bare spots where corrosion starts.

The primary object of this invention, therefore, is to provide a paint film that will not change color at temperatures ranging up to 1200 to 1600° Fahrenheit.

Another object is to provide a paint film that will have increased adhesive qualities when subjected to temperatures as high as 1200 to 1600° Fahrenheit.

A further object is to provide a film whose physical properties are so altered after the application of heat, that the film becomes insoluble in normal solvents such as paraffin, naphtha and/or most aromatic hydrocarbons.

Still another object is to provide a film that dries rapidly, is durable and pliable, and can be used either indoors or outdoors under all conditions of weather.

The non-discoloring thermo-coupling compound which forms the base of the hereinafter described protective film is made as follows: A neutral resin such as one of the thermoplastic terpene hydrocarbons, or coumarone-indene resin is used. For purposes of illustrating the method of making a typical formulation, coumarone-indene resin will be taken. A suitable quantity of this is heated and mixed with between 7.5% to 12% of its weight of a neutral paraffin wax, either white or yellow. This mixture is then heated to the melting point and held there for fifteen minutes. To this is added 0.5% to 1% by weight of titanium dioxide and 0.5% to 1% by weight of aluminum silicate. The mixture being subjected to additional heat until all the ingredients are thoroughly blended. This mixture is then reduced with aromatic hydrocarbons and/or petroleum spirits to a consistency that is suitable for milling with conventional paint grinding equipment.

While titanium dioxide has been given as a typical ingredient, other metallic oxides may be used instead, such as zinc oxide or aluminum oxide.

After milling, this compound may be used as a vehicle base for aluminum or any other kind of metal or pigment that will of itself not change color when heated.

To be used as a base for the vehicle of aluminum paint, the milled compound is reduced to 40% non-volatile and flake aluminum powder is added in the ratio of 1¼ pounds of powder to each gallon of vehicle.

To be used as a vehicle for pigment type paints, the milled compound is reduced to 50% non-volatile before adding the pigment.

While coumarone-indene resin has long been known and used in paints and varnishes, it has been found that it discolors and turns brown when heated above 300° or 400° Fahrenheit, and therefore produces a poor aluminum paint film for hot surfaces. However, when the coumarone-indene resin compound is prepared as outlined above, the resulting paint film does not discolor even when heated far beyond 400° F. to 1600° F. or any intermediate temperature. During and after heating, the film does not lose any of its reflective or decorative properties.

It was also found that the compound acts as a thermo-coupler between the aluminum flakes and the base metal. When applied to cold surfaces, the paint dries rapidly yielding a durable, pliable, film. This film can be removed by washing or immersing in normal solvents as is the case with all air dried paints. However, with the application of heat to the protected metal, such as is the case when a painted oven is heated, the physical properties of the film are changed so that the film becomes insoluble in normal solvents and adhesion is increased to such a degree that abrasives are necessary to remove the film.

While the exact reactions involved are not fully understood, it is believed that something analogous to electro-plating occurs between the aluminum and the base metal leaving the aluminum coupled directly to the base metal. This direct thermo-coupling action is thought to take place since no trace of the coumarone-indene resin, as such, can be found by chemical analysis after the test area has been heated to 1600° Fahrenheit.

It is to be understood that this invention is not limited to the use of this non-discoloring thermo-coupling compound as illustrated herein, but includes all other uses to which a compound of this character may be put.

I claim:

1. The method of manufacturing a non-discoloring thermo-coupling compound which consists in heating to the melting point a mixture of coumarone-indene with 7.5% to 12% of its weight of a neutral paraffin wax, maintaining the mixture at its melting point for 15 minutes, then adding 0.5% to 1% by weight of titanium dioxide and 0.5% to 1% by weight of aluminum silicate with the application of sufficient additional heat to thoroughly blend all of the ingredients, and then reducing the final mixture so obtained with aromatic hydrocarbons and petroleum spirits to a consistency that is suitable for milling with conventional paint grinding equipment.

2. A non-discoloring thermo-coupling compound consisting of coumarone-indene resin combined with 7.5% to 12%, by weight, of a neutral paraffin wax, 0.5% to 1%, by weight, of titanium dioxide and 0.5% to 1%, by weight, of aluminum silicate, said percentages being based upon the amount of coumarone-indene resin, the said mixture being reduced with petroleum spirits to a consistency suitable for milling with conventional paint grinding equipment.

References Cited in the file of this patent

UNITED STATES PATENTS

| Number | Name | Date |
|---|---|---|
| 2,474,309 | Gidley | June 28, 1949 |